United States Patent [19]

Claesen et al.

[11] Patent Number: 5,210,119

[45] Date of Patent: May 11, 1993

[54] POLYMER MIXTURE COMPRISING POLYPHENYLENE ETHER, STERICALLY HINDERED AMINE AND EPOXY COMPOUND AND ARTICLES MANUFACTURED THEREFROM

[75] Inventors: Christianus A. A. Claesen, Bergen op Zoom, Netherlands; Hideo Koike, Tochigi, Japan

[73] Assignee: General Electric Company, Pittsfield, Mass.

[21] Appl. No.: 711,004

[22] Filed: Jul. 3, 1991

Related U.S. Application Data

[62] Division of Ser. No. 256,936, Oct. 13, 1988, Pat. No. 5,045,578.

[51] Int. Cl.$^5$ .................. C08K 5/3435; C08K 5/521; C08L 71/12
[52] U.S. Cl. ................................. 524/99; 524/145; 524/394; 524/494; 524/508
[58] Field of Search ................ 524/101, 99, 100, 508, 524/394, 494; 525/68, 92, 66

[56] References Cited

U.S. PATENT DOCUMENTS

| | | |
|---|---|---|
| 4,086,204 | 4/1978 | Cassandrini et al. . |
| 4,233,412 | 11/1980 | Rody et al. . |
| 4,442,250 | 4/1984 | Cantatore . |
| 4,547,537 | 10/1985 | Malherbe et al. . |
| 4,843,116 | 6/1989 | Bopp . |
| 5,045,578 | 9/1991 | Claesen et al. .............. 525/905 |

FOREIGN PATENT DOCUMENTS

| | | |
|---|---|---|
| 60-149646 | 8/1985 | Japan . |
| WO/02021 | 7/1981 | World Int. Prop. O. .......... 524/394 |

OTHER PUBLICATIONS

Research Disclosure, No. 254, Jun. 1985, Kenneth Mason Publ. Ltd. Emsworth, Hampshire, GB F. Mutterer.

Primary Examiner—Jacob Ziegler

[57] ABSTRACT

The invention relates to polymer mixtures which comprise a polyphenylene ether, a sterically hindered amine, an epoxy compound, and a salt of a fatty acid. The polymer mixtures according to the invention have a good stability against discoloring by light.

12 Claims, No Drawings

POLYMER MIXTURE COMPRISING POLYPHENYLENE ETHER, STERICALLY HINDERED AMINE AND EPOXY COMPOUND AND ARTICLES MANUFACTURED THEREFROM

This is a division of application Ser. No. 07/256,936, filed on Oct. 13, 1988 now U.S. Pat. No. 5,045,578.

The invention relates to a polymer mixture comprising the following constituents:

A. a polyphenylene ether or a mixture of a polyphenylene ether and an, optionally rubber-modified, polystyrene,
B. a sterically hindered amine, and
C. an epoxy compound.

The invention also relates to articles formed from the polymer mixture according to the invention.

Polymer mixtures which comprises a polyphenylene ether, optionally mixed with a styrene polymer, a sterically hindered amine and an epoxy compound, are known from JP-A-60/149646. These known polymer mixture have a good light fastness.

The invention provides polymer mixtures which, compared with the above-mentioned known polymer mixtures, have an improved light fastness.

The polymer mixtures according to the invention are characterised in that the polymer mixture comprises 0.1–10 parts by weight of a salt of a fatty acid (constituent D) per 100 parts by weight of constituent A.

U.S. Pat. No. 4,442,250 described polymer mixtures which comprise a sterically hindered amine as a light stabiliser. The examples of this application describe polymer mixtures which comprise a polyolefin, a sterically hindered amine and calcium stearate. The calcium stearate is presumably used as a lubricant to improve the processibility.

The polymer mixture according to the invention preferably comprises zinc stearate as constituent D.

The polymer mixture according to the invention is preferably composed so that it contains per 0.1–5 parts by weight of consituent B, 0.1–5 parts by weight of constituent C, 0.1–5 parts by weight of constituent D and 100 parts by weight of constituent A.

The polymer mixture according to the invention preferably comprises a heterocyclic sterically hindered amine, for example, a compound having a piperidyl derivative, as constituent B.

In addition to the constituents mentioned hereinbefore, the polymer mixture according to the invention may optionally comprise conventional additives, for example, glass fibres, agents to improve the impact strength, agents for thermal stabilisation, agents to improve the flame-retarding properties.

The polymer mixture according to the invention comprises at any rate one or more constituents selected from the groups of constituents to be mentioned hereinafter:

A. a polyphenylene ether or a mixture of a polyphenylene ether and an, optionally rubber-modified, polystyrene,
B. a sterically hindered amine,
C. an epoxy compound, and
D. a salt of a fatty acid.

The polymer mixture according to the invention may moreover comprise conventional additives as constituent E.

A. Polyphenylene ether, mixture of polyphenylene ether and an, optionally rubber-modified, polystyrene.

Polyphenylene ethers are generally known polymers. Any polyphenylene ether know per se may be used in the polymer mixtures according to the invention. An elaborate list of suitable polyphenylene ethers is to be found, for example, in WO 87/00540.

Particularly suitable are poly(2,6-dimethyl-1,4-phenylene)ether, poly(2,6-diethyl-1,4-phenylene)ether, poly(2-methyl-6-ethyl-1,4-phenylene)ether. It is also possible to use copolymers, for example, copolymers which comprise units derived from 2,3,6-trimethylphenol and from 2,6-dimethylphenol.

Mixtures of polyphenylene ethers and an optionally rubber-modified polystyrene are also known per se. For this purpose reference may be made to U.S. Pat. No. 3,383,435; U.S. Pat. No. 4,128,602; U.S. Pat. No. 4,128,603; U.S. Pat. No. 4,128,604 and U.S. Pat. No. 3,943,191.

The mutual weight ratio between the polyphenylene ether and the polystyrene may be varied between wide limits.

B. Sterically hindered amine.

Sterically hindered amines are a group of compounds known per se which are generally used for stabilising polymers. Particularly suitable are the commercially available products. These products generally comprise compounds having groups derived from piperidine. Such compounds and their use as stabilisers for polymers are described, for example in U.S. Pat. No. 4,086,204; U.S. Pat. No. 4,233,412; U.S. Pat. No. 4,442,250 and EP-A-0172138.

C. Epoxy compounds

Epoxy compounds are compounds which comprise an epoxide group. Suitable epoxy compounds are, for example, compounds of the formula:

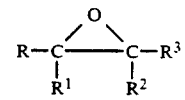

wherein R, $R^1$, $R^2$ and $R^3$ represent an organic group. 3,4-Epoxyhexahydrobenzyl-3,4-epoxyhexahydrobenzoate and triglycidyl isocyanurate are to be preferred.

D. Salts of fatty acids.

The polymer mixtures according to the invention comprise one or more salts of fatty acids. As fatty acids may be used unsaturated and saturated acids. These acids may comprise aromatic groups.

The salts may also be derived from alkali metals and alkaline earth metals. Salts derived from other metals, for example, Mn, Fe, Zn, may also be used. Zinc salts are to be preferred.

Examples of suitable salts are zinc stearate, zinc oleate, zinc laurate, zinc palmitate, zinc behenate, zinc arachinate.

E. Conventional additives

In addition to the constituents mentioned hereinbefore, the polymer mixture according to the invention may comprise one or more additives. Examples of suitable additives are dyes, pigments, reinforcing fibres, for example, glass fibres, agents to improve the impact strength, agents to improve the stabilisation and agents to improve the flame-retarding properties.

Vinylaromatic diene diblock or triblock copolymers are preferably used as agents to improve the impact strength. These block copolymers may be partially hydrogenated.

Phosphorus-containing compounds may be used as thermal stabilisers. Phosphate esters are frequently used as flame-retardants.

The polymer mixture according to the invention may be prepared in the usual manner. It is prefarably prepared by compounding the desired constituents together in an extruder and processing them to pellets. Articles can be obtained from the resulting pellets, for example, by extrusion or injection-moulding.

The invention will be described in greater detail with reference to the following specific examples.

EXAMPLE I

Various polymer mixtures were prepared having a composition as described hereinafter. The said constituents were compounded in an extruder and processed to pellets. Test plates were manufactured from the pellets by injection moulding. A part of the resulting plates were exposed to light under filtered UV light (Xenon lamp with window glass filter) for 700 hours. The change in colour of the exposed plates was determined in comparison with a non-exposed plate manufactured from the same polymer mixture. The changes in colour were measured and calculated according to CIELAB (DIN 6174). The discoloring is indicated in the table hereinafter as Delta $E_{ab^*}$ value. The discoloring is stronger according as the said value is higher.

All polymer mixtures always comprise 35 parts by weight of poly(2,6-dimethyl-1,4-phenylene)ether, having an intrinsic viscosity of 0.47 dl/g, measured in $CHCl_3$ at 25° C., 65 parts by weight of high-impact polystyrene, 10 parts by weight of a mixture of organic phosphate esters, 0.8 parts by weight of stabilisers, 5 parts by weight of titanium dioxide, and 2 parts by weight of a sterically hindered amine. The following commercially available products of Ciba Geigy were used as a sterically hindered amine: CHIMASORB® 944; Tinuvin® 770 and Chimasorb® P 944. These are invariably products which comprise groups derived from piperidine.

Nearly all the polymer mixtures comprise an epoxy compound, namely triglycidyl isocyanurate or 3,4-epoxy hexahydrobenzyl-3,4-epoxyhydrobenzoate in a quantity as indicated in the table hereinafter. Approximately half of the polymer mixtures comprise a salt of a fatty acid, namely zinc stearate, in a quantity of 0.5 parts by weight. The balance did not contain any zinc stearate.

The composition and the resulting Delta $E_{ab^*}$ values are recorded in the table hereinafter.

TABLE

| Hindered amine | Epoxy compound (parts by weight) | | Parts by zinc stearate | Delta $E_{ab^*}$ value |
|---|---|---|---|---|
| Chimasorb 944 | | | 0 | 8.4 |
| | TGI | (0.6) | 0 | 5.6 |
| | TGI | (0.6) | 0.5 | 4.3 |
| | TGI | (1.3) | 0 | 5.3 |
| | TGI | (1.3) | 0.5 | 3.4 |
| | EBEB | (0.9) | 0 | 7.2 |
| | EBEB | (0.9) | 0.5 | 4.9 |
| | EBEB | (1.9) | 0.5 | 4.7 |
| Tinuvin 770 | — | | 0 | 6 |
| | TGI | (0.6) | 0 | 4.7 |
| | TGI | (0.6) | 0.5 | 3 |
| | TGI | (1.3) | 0 | 4.0 |
| | TGI | (1.3) | 0.5 | 2.8 |
| | EBEB | (0.9) | 0 | 5.8 |
| | EBEB | (0.9) | 0.5 | 4.1 |

TABLE-continued

| Hindered amine | Epoxy compound (parts by weight) | | Parts by zinc stearate | Delta $E_{ab^*}$ value |
|---|---|---|---|---|
| | EBEB | (1.9) | 0 | 5.2 |
| | EBEB | (1.9) | 0.5 | 3.9 |
| Chimasorb P944 | | | 0 | 7.7 |
| | TGI | (0.6) | 0 | 5.8 |
| | TGI | (0.6) | 0.5 | 4 |
| | TGI | (1.3) | 0 | 4.2 |
| | TGI | (1.3) | 0.5 | 3.9 |
| | EBEB | (0.9) | 0 | 8.1 |
| | EBEB | (0.9) | 0.5 | 5.5 |
| | EBEB | (1.9) | 0 | 5.4 |
| | EBEB | (1.9) | 0.5 | 6.2 |

TGI = Triglycidyl isocyanurate
EBEB = Epoxyhexahydrobenzyl-3,4-epoxyhexahydrobenzoate It will be obvious from the results shown that polymer mixtures which, in addition to the amine and the epoxy compound, comprise a zinc stearate have a better light fastness.

We claim:

1. A polymer mixture which comprises:
   a) at least one polyphenylene ether, or a mixture of polyphenylene ether and polystyrene resin;
   b) a sterically hindered amine;
   c) and epoxy compound;
   d) a salt of a fatty acid, present at a level of 0.1-10 parts by weight per 100 parts by weight of constituent A; and
   e) at least one additive selected from the group consisting of dyes, pigments, reinforcing fibres, thermal stabilization agents, and flame retardants.

2. The polymer mixture of claim 1, wherein the polyphenylene ether is selected from the group consisting of poly(2,6-dimethyl-1,4-phenylene)ether, poly(2,6-diethyl-1,4-phenylene)ether, poly(2-methyl-6-ethyl-1,4-phenylene)ether; and copolymers comprising units derived from 2,3,6-trimethylphenol and 2,6-dimethylphenol.

3. The polymer mixture of claim 1, wherein constituent (b) is a heterocyclic compound.

4. The mixture of claim 3, wherein constituent (b) is a piperidyl derivative.

5. The polymer mixture of claim 1, wherein the epoxy compound has the formula

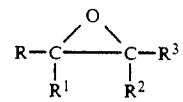

wherein each R, $R^1$, $R^2$ and $R^3$ represents an organic group.

6. The polymer mixture of claim 5, wherein the epoxy compound is either 3,4-epoxyhexahydrobenzyl-3,4-epoxyhexahydro-benzoate or triglycidyl isocyanurate.

7. The polymer mixture of claim 1, wherein constituent (D) is a salt derived from a metal selected from the group consisting of alkali metals, alkaline earth metals, manganese, iron, and zinc.

8. The polymer mixture of claim 1, wherein the polystyrene resin is rubber-modified.

9. The polymer of claim 1, wherein the reinforcing fibers are glass.

10. the polymer mixture of claim 1, wherein the stabilizer is a phosphorus-containing compound.

11. The polymer mixture of claim 1, wherein the flame retardant is a phosphate ester.

12. Articles formed from the polymer mixture of claim 1.

* * * * *